United States Patent [19]

Huff

[11] 4,379,953
[45] Apr. 12, 1983

[54] TELEPHONE SWITCH RETAINING APPARATUS

[76] Inventor: Leslie G. Huff, 11512 Tincup #208, Austin, Tex. 78750

[21] Appl. No.: 291,558

[22] Filed: Aug. 10, 1981

[51] Int. Cl.³ ............................................... H01H 9/22
[52] U.S. Cl. .................................... 179/178; 179/167; 200/321
[58] Field of Search ............... 179/167, 161, 103, 102, 179/189 R, 178, 158; 200/318, 321, 322, 157

[56] References Cited

U.S. PATENT DOCUMENTS

| | | | |
|---|---|---|---|
| 1,077,225 | 10/1913 | Keith | 179/158 R |
| 4,006,334 | 2/1977 | Robotham et al. | 200/157 |
| 4,034,167 | 7/1977 | Boyd | 179/178 |
| 4,131,768 | 12/1978 | Wood | 179/178 |

FOREIGN PATENT DOCUMENTS

| | | | |
|---|---|---|---|
| 121676 | 12/1927 | Switzerland | 179/167 |
| 112102 | 6/1917 | United Kingdom | 179/167 |

*Primary Examiner*—Joseph A. Popek
*Attorney, Agent, or Firm*—Cox & Smith Incorporated

[57] ABSTRACT

A telephone switch retaining apparatus for securing to a telephone handset having a receiver and transmitter, including a first means for securing to the handset with a second means slidably mounted with the first means to selectively engage and depress the switch button of the handset and maintain the switch button depressed.

9 Claims, 4 Drawing Figures

U.S. Patent    Apr. 12, 1983    4,379,953
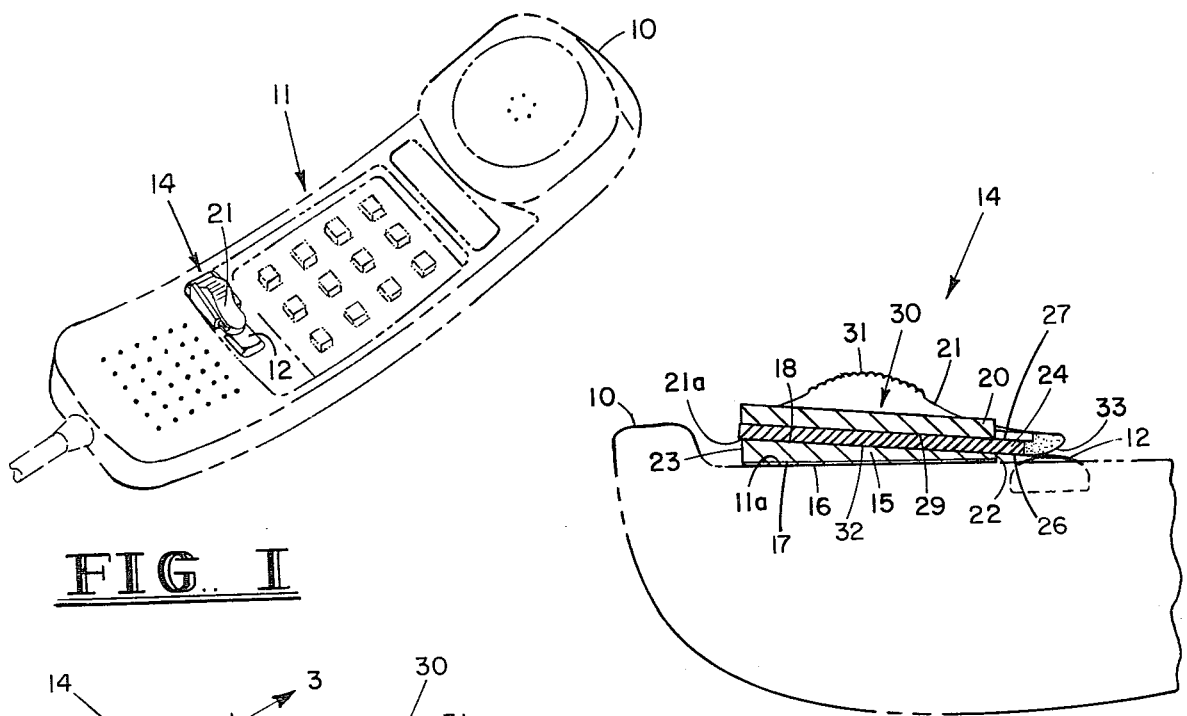
FIG. 1
FIG. 3
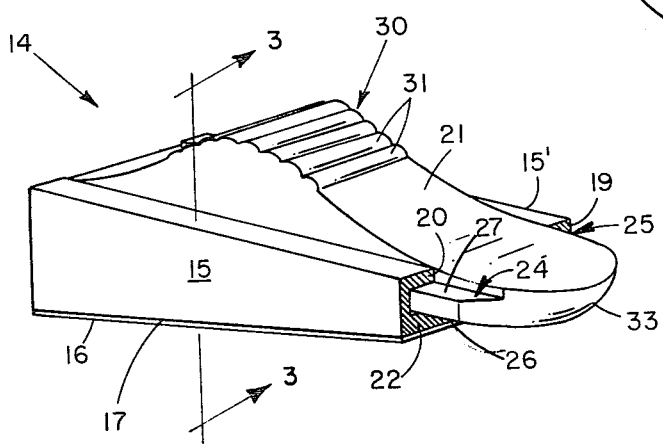
FIG. 2
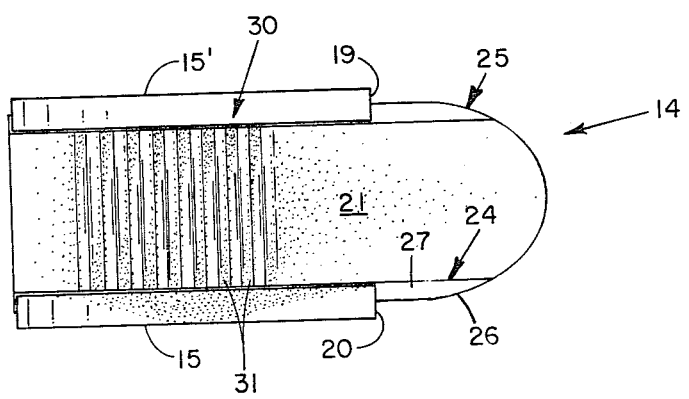
FIG. 4

TELEPHONE SWITCH RETAINING APPARATUS

BACKGROUND OF THE INVENTION

This invention relates generally to a telephone switch retaining apparatus to engage and depress and maintain depressed the switch on a telephone hand set of the type having the dial in the hand set. More particularly the invention relates to a switch that can be affixed to the telephone hand set adjacent the switch button for engaging and retaining the switch button in an engaged position when the hand set is removed from the phone cradle.

It is known in the prior art to provide a device for retaining the switch on a hand set of a telephone in a depressed position. Examples of such devices are shown in U.S. Pat. Nos. 4,034,167 and 4,131,768. It is also known to provide a switch on a telephone hand set. Examples of these are shown in U.S. Pat. Nos. 1,077,225, 2,002,504 and 3,839,604.

There has existed a need for a commercially practical device for maintaining the switch button on a telephone hand set in a depressed position. This is particularly true in the case of modern wall phones and Trimline phones. These phones generally have a dial or push buttons in the hand set and a small button which functions as a switch hook button. Sometimes it is desirable to remove the hand set from the cradle or wall holder. However, after removal it is necessary to maintain the switch button depressed or the phone wall become inoperative if left off the hook for a period of time.

It is an object of this invention to provide a reliable and inexpensive mechanism to maintain the switch button depressed so that the hand set can be removed from the cradle or holder and placed at a remote location away from the cradle or wall holder without rendering the phone inoperative. The invention enables anyone to conveniently place the handset at an accessible location so that it is not necessary to get up to answer the phone. The apparatus can be installed and removed from the handset without damaging the handset. It also does not interfere with the normal operation of the telephone. Other objects of the invention will become apparent from the following detailed description.

SUMMARY OF THE INVENTION

A telephone switch control button apparatus for attachment to a telephone having a switch button which includes a first member for securing adjacent the switch button and a second member comprising a slidable switch means to engage the switch button and maintain it in a depressed position until it is desirable to release it. The apparatus is preferably made of two pieces for economy of manufacture and the first member is secured to the telephone by adhesive means so that it does not damage the telephone or interfere with the operation of the telephone. The switch is of compact size so that it will not interfere with conventional use of the telephone or positioning of the hand set in the cradle of the telephone.

BRIEF DESCRIPTION OF THE DRAWING

FIG. 1 is a perspective view of the telephone switch retaining apparatus position on the hand set of a telephone.

FIG. 2 is a perspective view of the telephone switch retaining apparatus of the invention.

FIG. 3 is a cross sectional view of the telephone switch retaining device of the invention showing it in position depressing the switch button of a hand set.

FIG. 4 is a plan view of the telephone switch retaining apparatus.

BRIEF DESCRIPTION OF THE PREFERRED EMBODIMENT

Referring to FIG. 1 of the drawing, there is shown a conventional type telephone hand set 10. The telephone hand set 10 includes a push button dialing means 11 and a switching button 12. The telephone hand set 10 is of conventional design and its operation is well known. Secured to the hand set 10 is a telephone switch retaining apparatus 14.

Referring to FIG. 2 of the drawing, the telephone switch retaining apparatus 14 includes a first means 15 which is adapted to be secured to the telephone hand set adjacent the button 12 as shown in FIGS. 1 and 3. A securing means 16 is provided to securely connect the telephone switch retaining apparatus to the surface 11a shown in FIG. 3 of the telephone hand set. In the preferred embodiment the securing means 16 is in the form of an adhesive means which may be double sided tape which is secured to the generally flat surface 17 of the first means 15. The adhesive secures the apparatus 14 to the telephone hand set as more clearly shown in FIG. 3.

The first means 15 includes a surface 18 which is inclined at an acute angle to the flat surface 17. Members 19 and 20 are L-shaped to provide a longitudinal retaining track for slidably retaining the second or switch means 21. The means 19–20 are in the form of L-shaped members connected with the surface 18 to form a track for slidably receiving the second means 21. The second means 21 acts as a switch depressing means for engaging the switch button 12 on the phone as shown in FIG. 3. As shown in FIG. 3 the surface height 22 of the first member 15 is shorter than the surface height 23 which provides the inclined angle of the surface 18.

The second means 21 includes a generally flat first surface 21a which is slidably positioned on the surface 18. The slide means 24 and 25 as shown in FIG. 4 are received by the means 19 and 20 respectively. The slide means 24 and 25 are symetrical so a detailed description is provided for the slide means 24. The slide means 24 is slidably received by the third member 20. It includes a generally flat surface portions 26 and 27. As shown in FIG. 3, the flat surface portions 26 and 27 frictionally engages the surfaces 18 and 29 respectively on the member 20 to frictionally retain the second means 21 in a desired position. The distance between the surfaces 29 and 18 are such to provide sufficient friction so that the second means 21 is retained in position. The frictional fit is not so snug as to prevent the retraction of the second means 21 with relative ease thereby facilitating answering an incoming call or to place an outgoing call.

The second means 21 includes a raised portion 30 having a plurality of ribs 31 which are adapted to be engaged by the finger of someone using the invention.

The lower surface 32 of the second means 21 frictionally engages the surface 18 and includes a curved snubbed portion 33 at one end which engages the switch button 12. The curved suface 33 is positioned above the switch button 12 a predetermined distance and has a degree of curvature so that when the telephone switch retaining apparatus is in place it can slidably engage and depress the switch button 12 with longitudinally sliding movement. This is also achieved by the heights of the surfaces 22 and 23 relative to surface 17. During operation, in order to engage the switch button 12, one applies a sliding force against the raised portion 31 to cause the second means 21 to slide to the right as shown in FIG. 3 and engage and depress the switch button 12. This can be generally achieved without manually depressing the switch button 12 before moving the fourth means. The slide means 24 and 25 retain the second means 21 in engaged and switching position to maintain a disconnection of the telephone switch button. When it is desired to release the switch button to operate the telephone, one need merely apply a sliding force to the left as shown in FIG. 3 to disengage the curved surface 33 from the switch button 12.

The device is preferably made of only two integral pieces and a securing means 17. The two pieces can preferrably be made of injection plastic material for economy of manufacture.

Although the invention has been described in conjunction with the foregoing specific embodiment, many alternatives, variations and modifications are intended to fall within the spirit and scope of the appended claims.

I claim:

1. A telephone switch retaining apparatus comprising:
   a first means including a generally flat surface with securing means for securing the first means to a telephone apparatus having a receiver, transmitter and a switch button;
   a second means included with the first means for longitudinal sliding movement and being positioned relative to the first means such that longitudinal sliding movement of the second means will selectively engage and depress the switch button of said telephone apparatus as a result of the sliding engagement and maintain the switch button depressed.

2. The apparatus as set forth in claim 1 wherein:
   the second means has a raised portion for engaging by anyone to slide the second means to a desired position.

3. The apparatus as set forth in claim 1 wherein:
   the height of the first and second means is such that said telephone apparatus can be hung up in its rest position without interference by said first and second means.

4. A telephone switch retaining apparatus comprising:
   a first means for securing said retaining apparatus to a telephone apparatus having a receiver, transmitter and a switch button;
   a second means mounted on the first means for longitudinal sliding movement and being positioned relative to the first means such that longitudinal sliding movement of the second means will selectively engage and depress the switch button of said telephone apparatus as a result of the sliding engagement and maintain the switch button depressed;
   said first means including retaining means to frictionally retain the second means in a desired position and to allow said second means to be longitudinally and slidably moved.

5. The apparatus as set forth in claim 4 wherein:
   the retaining means includes a friction surface which frictionally retains the second means in said desired position.

6. The apparatus as set forth in claim 5 wherein:
   the second means includes friction surfaces which frictionally retain the second means in said desired position.

7. The apparatus as set forth in claim 4 wherein:
   the retaining means include opposed channel means on the first means which slidably retain the second means.

8. A telephone switch retaining apparatus comprising:
   a first means for securing said retaining apparatus to a telephone apparatus having a receiver, transmitter and a switch button;
   a second means mounted on the first means for longitudinal sliding movement and being positioned relative to the first means such that longitudinal sliding movement of the second means will selectively engage and depress the switch button of said telephone apparatus as a result of the sliding engagement and maintain the switch button depressed;
   said first means including a flat surface for securing said first means to said telephone apparatus and a second surface positioned at an acute angle to the first surface for slidably receiving the second means which engages and depresses the telephone switch button.

9. A telephone switch retaining apparatus comprising:
   a first means for securing said retaining apparatus to a telephone apparatus having a receiver, transmitter and a switch button;
   a second means mounted on the first means for longitudinal sliding movement and being positioned relative to the first means such that longitudinal sliding movement of the second means will selectively engage and depress the switch button of said telephone apparatus as a result of the sliding engagement and maintain the switch button depressed; and
   said second means having a curved engaging and depressed portion which engages said telephone switch button upon initial sliding movement and depresses said switch button upon further sliding movement.

* * * * *